United States Patent [19]
Eitrich

[11] Patent Number: 5,689,414
[45] Date of Patent: Nov. 18, 1997

[54] ARITHMETIC AND LOGIC UNIT

[75] Inventor: Frank-Thomas Eitrich, Reutlingen, Germany

[73] Assignee: Robert Bosch GmbH, Stuttgart, Germany

[21] Appl. No.: 491,886

[22] PCT Filed: Oct. 15, 1994

[86] PCT No.: PCT/DE94/01222

§ 371 Date: Jun. 23, 1995

§ 102(e) Date: Jun. 23, 1995

[87] PCT Pub. No.: WO95/12756

PCT Pub. Date: May 11, 1995

[30] Foreign Application Priority Data

Oct. 30, 1993 [DE] Germany ............................ 43 37 132.9

[51] Int. Cl.⁶ .................................................. G05B 19/042
[52] U.S. Cl. ........................................ 364/136; 364/431.051
[58] Field of Search ...................... 364/431.055, 431.052, 364/431.053, 131, 132, 187, 130, 136, 431.051, 431.04; 123/416, 417

[56] References Cited

U.S. PATENT DOCUMENTS

| | | | |
|---|---|---|---|
| 4,348,728 | 9/1982 | Sagisaka et al. | 364/431.055 |
| 4,602,324 | 7/1986 | Fujawa et al. | 364/130 |
| 5,233,530 | 8/1993 | Shimada et al. | 364/431.055 |
| 5,233,964 | 8/1993 | Jamoua et al. | 123/479 |
| 5,247,444 | 9/1993 | Arai et al. | 364/431.055 |
| 5,267,542 | 12/1993 | Keskula | 123/417 |

FOREIGN PATENT DOCUMENTS

| | | |
|---|---|---|
| 0 494 467 | 7/1992 | European Pat. Off. . |
| 2732781 | 1/1987 | Germany . |

Primary Examiner—Collin W. Park
Attorney, Agent, or Firm—Michael J. Striker

[57] ABSTRACT

The controller system includes a control logic device and a controller arranged between a processor and the control logic device. The control logic device includes a stored initiation value for initiating a task activated by the control logic device, a device for making a comparison between the stored initiation value residing in the control logic device and an incrementally changing time value and a device for initiating the task when the stored initiation value therein corresponds to the incrementally changing time value. The controller advantageously includes a device for making a comparison of the new initiation value transferred from the processor, the stored initiation value and the time value with each other to obtain additional information; a device for transferring the new initiation value to the control logic device for storage as the stored initiation value after the comparison in the controller and a device for transmitting the additional information to the control logic device according to results of the comparison in the controller.

6 Claims, 2 Drawing Sheets

ARITHMETIC AND LOGIC UNIT

BACKGROUND OF THE INVENTION

The invention relates to an arithmetic and logic unit, in particular belonging to a controller for internal combustion engine fuel injection systems and/or internal combustion engine ignition systems, having a processor and a control logic device, wherein a control device acting as an interface and carrying out specific processor tasks in order to relieve the load on the processor is connected between the processor and the control logic device.

Arithmetic and logic units of the type mentioned initially are known. They are used, for example, for carrying out control tasks. In the case of extensive control tasks, constrained addressing conditions and overloading of the processor can occur, which lead to it not being possible to carry out the data processing in an available time interval. Changes which occur during the calculation of data and would lead to data changes are possibly no longer considered at the correct time if the processor is overloaded.

A device of the type mentioned initially is disclosed in German Patent 27 32 781. This device has a microprocessor which is relieved of the load of determining specific signals, so that it can carry out its other tasks better.

SUMMARY OF THE INVENTION

The arithmetic and logic unit according to the invention has the advantage that a controller is connected between the processor and the control logic device, which controller acts as an interface and carries out specific processor tasks in order to relieve the load on the processor. To this end, it is provided that information is transmitted between the processor and the control logic device in relation to which the controller generates additional information to which the control logic device reacts. In the course of this application, "information" is to be understood to be electronic data information comprising addresses and/or data (datum). According to the above explanations, the processor thus carries out only part of the work; the other part of the work is carried out by the controller. If data which are not changed by the controller are transmitted from the processor to the control logic device, then this area acts in a conventional manner, that is it appears as if the processor is connected directly to the control logic device. In addition, however, the circumstance can arise in which the controller produces additional signals/information which are transmitted to the control logic device via an internal bus, in particular an internal control bus (ISB). In consequence, the processor is relieved of the load since it does not carry out the entire task. As has already been mentioned above, it is additionally or alternatively also possible for information to be transmitted between the processor and the control logic device, which information passes through the controller, being changed. In particular, data which are changed while passing through the controller are transmitted from the processor to the control logic device, the changed data passing from the controller to the control logic device via an internal bus, in particular an internal data bus (IDB). Alternatively or additionally it is possible for information to be transmitted between the processor and the control logic device to pass through the controller which tests the information for specific criteria and, if the criteria are not satisfied, refuses to pass the information on to the control logic device. The controller thus carries out monitoring tasks which do not need to be carried out by the processor, and this leads to relief of the processor load. It is provided in particular that data which are to be transmitted from the processor to the control logic device pass through the controller which tests them for consistency and refuses to pass the data on to the control logic device as a function of the test result. If the data are consistent, that say the criteria applicable to the relevant case are satisfied, then the data from the processor are transmitted to the control logic device.

If specific conditions are not satisfied, then the component which carries out the check is not the processor but the controller, the processor admittedly finding out the generated data which, however, do not pass to the control logic device because of the blocking controller. The controller is preferably virtually "invisible" for the processor, that say the processor processes, for example, a control task and emits data to the control logic device which data, however, initially pass to the controller and are possibly changed there. The controller then passes the possibly changed data on to the control logic device. The work which is carried out by the actions of the controller therefore need not be carried out by the processor, so that it is relieved of load.

In addition or alternatively, external information, for example external information from the control process, is passed to the controller, which information can initiate communication between the controller and control logic device independently of the processor. For example, process parameters are not fed to the processor but to the controller, so that the processor is relieved of load. The controller autonomously processes these parameters or changes in the parameters interacting with the control logic device without the processor "noticing" this.

In particular, the external information can be based on the occurrence of an external event, data communication between the controller and the control logic device taking place on the basis of the occurrence of the event, which data communication—as stated—does not lead to the involvement of the processor.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

The invention relates to an arithmetic and logic unit which has a processor and a control logic device, there being an "additional unit" in the microprocessor-controlled system, namely a controller, which is connected as an interface between the processor and the control logic device and carries out tasks which have been offloaded from the processor. The interconnection of the controller and the control logic device is called a "controller system" in the following text.

Figure 1:
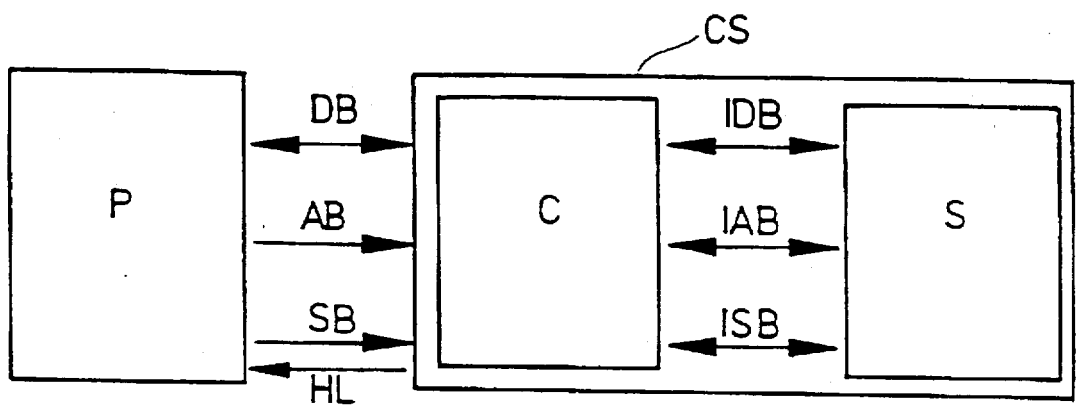
FIG. 1 is a block diagram of an arithmetic and logic unit.

According to FIG. 1, the controller system CS is controlled from the processor P by three line types. An address bus AB leads from the processor P to the controller system CS. A control bus SB furthermore leads from the processor P to the controller system CS. Furthermore, a hold line HL is provided which leads from the controller system CS to the processor P and is used to stop the processor P when the controller system CS is operating relatively slowly. If the action has been processed in the controller system CS, then the processor P is requested via the hold line HL to feed information to the controller system CS once again. Finally, the processor P is connected to the controller system CS via a bidirectional data bus DB.

The controller system CS comprises a controller C and a control logic device S. The controller C and the control logic device S are connected to one another by means of an internal control bus ISB and by means of a bidirectional internal data bus IDB and a bidirectional address bus IAB.

The processor P communicates with the controller system CS using either a READ instruction or a WRITE instruction or a READMODIFYWRITE instruction. In the READ mode, the processor P passes an address to the address bus AB and signals the READ instruction via the control bus SB. The controller C sets a HOLD signal in order to stop the processor P. This action can also be suppressed if the controller C reports to the processor P on the basis of the selected address that the controller C can carry out the desired READ action sufficiently fast, the controller C is in principle fast enough, or if it can be seen from the address that the controller C has not been addressed. The controller C uses the received address to address the desired register, which can be located either in the controller C or in the control logic device S. The controller C transfers the data from the register via the data bus DB to the processor P. After the data transfer has taken place, the HOLD signal is withdrawn in order to allow the processor P to continue its work.

In the WRITE mode, the processor P passes an address to the address bus AB and signals the WRITE instruction via the control bus SB. At the same time, the processor P passes the data to the data bus DB. The controller C uses the received address to address the desired register, and transfers the data from the data bus DB to this register, which can be located in the controller C or in the control logic device S.

In the READMODIFYWRITE mode, the processor P passes an address to the address bus AB and signals the READ instruction via the control bus SB. At the same time, the controller C uses the received address to address the desired register, which, once again, can be located either in the controller C or in the control logic device, and transfers the data from the register to the processor P via the data bus DB. The processor P processes the data, thus received, from the data bus DB. The processor P signals the WRITE instruction via the control bus SB. At the same time, the processor P passes the newly processed data to the data bus DB. The controller C uses the received address to address the desired register and transfers the data from the data bus DB to this register.

According to another exemplary embodiment, it is also possible to provide intermediate steps. The addressing of the control logic device S is always an address specified by the processor P, it being possible for this to be done however, via a plurality of steps and via a plurality of buffer-storage operations of a partial address in an address-supplement register.

The invention provides that
a) data pass from the processor P to the control logic device S in unchanged form, additional signals being generated on the internal control bus ISB, however, to which the control logic device S reacts,
b) the contents of the data are changed, that is corrected data are transmitted from the controller C to the control logic device S via the internal data bus IDB,
c) the data from the processor P are tested for consistency by the controller C, and passing said data on to the control logic device S is possibly refused,
d) external events which are passed to the controller C can initiate data communication between the controller C and the control logic device S independently of the processor P.

An exemplary embodiment of case a now follows. The following option for use of the arithmetic and logic unit according to the invention will be described first. This can be used for example, for carrying out tasks in controllers of internal combustion engines. With the aid of the arithmetic and logic unit according to the invention, it is possible to carry out driving of, assistance to and simplification of electronic circuits for motor vehicle injection control systems and/or motor vehicle ignition control systems. Furthermore, the subject-matter of the invention is suitable, in a simple manner, for the testing of electronic circuits.

In the case of the cited injection system and ignition system tasks, it is necessary to compare a predetermined value (called the initial value or initiation value) with a timer value which is changed incrementally. In the specific case of a motor vehicle controller, the system reaction is made dependent on the angular position of the cam shaft. The angular position of the cam shaft, which changes in use, represents the timer value. The following text is intended to describe the start and end of an injection process. The movement direction of the angle, that is the angular position of the cam shaft, takes place in only one direction, that is the angular value can always only increase and the value range is repeated cyclically. When 359° is passed through, the angle is incremented to 360°, the angular value assigned to the angle jumping back to the value 0°. Because of the cyclic nature, a description of a relatively large angular value and of a relatively small angular value means the same as the terms "later" and "earlier". An injection process can thus be started at 350° and ended at 20°, the initial value being "larger" than the final value of the injection action. An important precondition for use of the digital preset of a cyclic angle (timer value or angular clock=angular position of the cam shaft) is the incremental change in the value. This means that, in the event of any change, the angular clock value must assume all the values located in between in a rising sequence.

Figure 2:
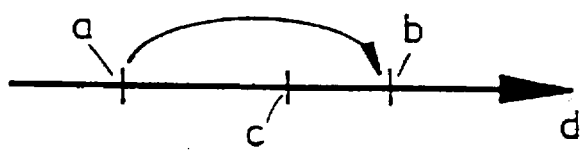
FIG. 2 shows an illustration of the problems of initial value changes '

An action of the control unit must be carried out when a predetermined, stored "initiation value" corresponds with the value of the angular clock (angular position of the cam shaft). However, it must be noted that a change in the initiation value must not take place at the same time as the change in the angular clock. Reference is made to FIG. 2 in this context. In this figure, the meanings are: a=previous initiating value (initiation has already taken place), b=new initiating value, c=current actual value and d=incremental event (timer). If it is intended to reduce the initiation value from, for example, 25° to 24° in order to advance the start of the injection process without using a controller C, the angular clock value must not be increased from 24° to 25° at the same time. In such a case, the arithmetic and logic unit in the control system S cannot detect correspondence of the values and the intended action of "injection" does not occur.

Figure 3:
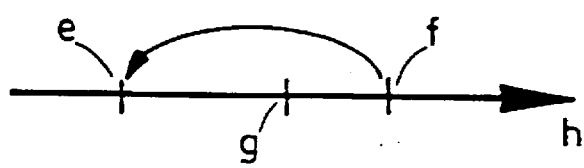
FIG. 3 shows an illustration corresponding to FIG. 2.

For the same reason, a change in the initiation value cannot be carried out without knowledge of the current angular clock status (cf. FIG. 3). In FIG. 3, the meanings are: e=new initiating value (there is no longer identity), f=previous initiating value, g=current actual value and h=incremental event (timer). If it is intended to reduce the initiation value from, for example, 25° to 20° in order to advance the start of the injection process without using a controller C, the angular clock value must not at the same time be in the range from 21° to 24°, since no value correspondence can be detected in this case either, so that the angular clock value is "jumped over".

In order to solve the above problems in changing the initial value in a fuel injection system of an internal combustion engine, the controller C must know the current actual values of the "angular clock" (angular position of the cam shaft). This is preferably done either by the angular clock being generated in the controller C or by corresponding information on the state of the angular clock being fed to an input of the controller C. The processor P presets an initiation value, that is the initial value for the start of the injection process. The processor P writes this new initiation value into the control logic device S as the initial value. The controller C uses the address to detect the fact that this is an initiation value, and writes this new initiation value into a buffer store. At the same time, the controller C uses the unchanged address to read the old initiation value, which was valid until now. The difference between the data of the new initiation value, the old initiation value and the currently present position of the angular clock is used to determine whether this is the case in FIG. 2 or the case in FIG. 3, or neither of the two cases. This additional information is sent together with the buffer-stored new initiation value from the controller C to the control system S, so that the latter can initiate an injection process (case 2, FIG. 3) or sets an identifier that the next initiation must be ignored since it has already taken place (case 1, FIG. 2). From the above argument, it becomes clear that data from the processor P are transmitted to the control logic device S in an admittedly unchanged form, additional signals being generated, however, to which the control logic device reacts.

The following table shows the respective reaction of the arithmetic and logic unit for the various cases.

| Comparisons: | | | |
|---|---|---|---|
| New_initial value ? Old_initial value | New_initial value ? Angular clock | Old_initial value ? Angular clock | Reaction: |
| = | any | any | Case 0 |
| > | = | < | Case 3 |
| > | > | = | Case 1 |
| > | > | > | Case 3 |
| > | > | < | Case 1 |
| > | < | any | Case 3 |
| < | = | > | Case 2 |
| < | > | any | Case 3 |
| < | < | = | Case 3 |
| < | < | > | Case 2 |
| < | < | < | Case 3 |

Case 0: No reaction, new value does not need to be transferred to the control logic device.
Case 1: In addition to the new value, the control logic device receives the information that the initiation has already taken place, in order to suppress second initiation, cf. FIG. 2.
Case 2: As well as the new value, the control logic device receives the instruction to initiate, cf. FIG. 3.
Case 3: No additional reaction while the new value is being transferred to the control logic device.

Using the example, mentioned above, of the fuel injection system of an internal combustion engine, it is intended to describe case b, in which the arithmetic and logic unit according to the invention changes the context of data, that is the corrected data are transmitted from the controller C to the control logic device S via the internal data bus IDB. The same preconditions apply as those explained in the example for case a. It is now assumed that the processor P writes a new initiation value into the control logic device S. The controller C uses the address to detect the fact that this is an initiation value, and writes this new initiation value into a buffer store. At the same time, the controller C uses the unchanged address to read the preceding, old initiation value into a second buffer store. The difference between the data is used to determine whether the new initiation value is larger than or smaller than the old initiation value. Instead of a single writing process into the control logic S, the old initiation value is matched by incremental steps to the new initiation value, in that a corresponding number of successively following writing processes are generated from the controller C to the control logic device S, whose data in each case approach the desired new initiation value by the value 1.

In order to carry out a relative data change, that is the statement of the change to an item of data, the processor P writes the desired change in the initiation value into the control logic device S and identifies this value as a relative value, either by using a modified address or by setting a fixed bit in the data item (the data). The controller C stores this new relative initiation value in a buffer store. At the same time, the controller C uses the unchanged address, or the address which has been modified back, to read the old initiation value into a second buffer store. The sum of the old initiation value and the new initiation value is determined and is written back using the unchanged address, or the address which has been modified back, to the control logic device S. By transmitting the relative value "−2", the processor P thus initiates a reduction in the initiation value by two units, without any knowledge of the current initiation value.

This process can also be implemented by the processor P which, however, requires a number of program steps for this purpose and therefore requires a certain amount of time. However, this covers the possibility that conditions (for example the position of the angular clock) can change during the computation time, as a result of which either the reaction becomes inaccurate or the program can become large and complicated in order to cover all the possible cases, but in any case the processing can become time-intensive.

Figure 4:
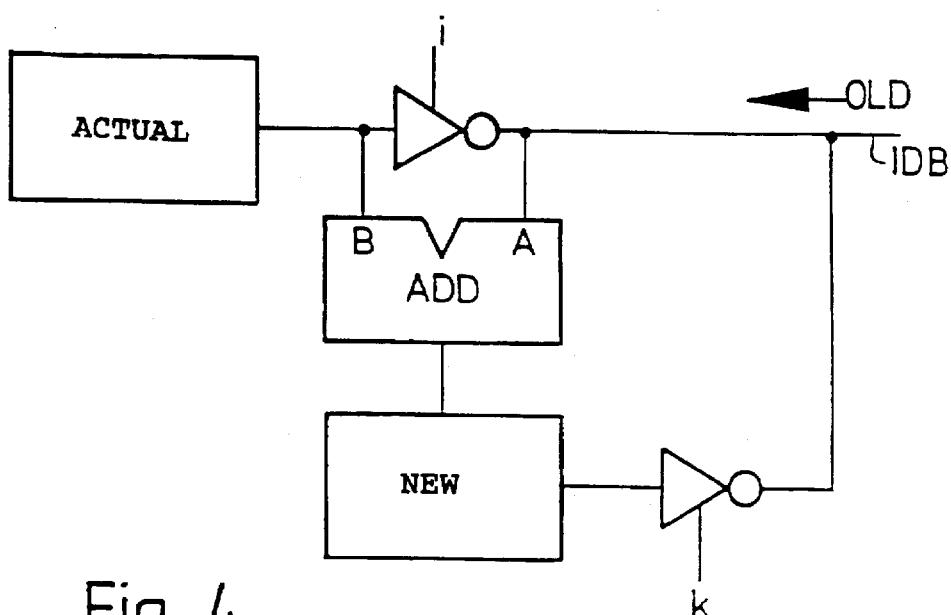
FIG. 4 is a block diagram.

Reference is made to FIG. 4 with respect to the possibility of processing relative changes of data. The meanings in this case are i=write the ACTUAL value and k=write the NEW value. If a conversion from relative data to absolute data is allowed, then the previous register value OLD is read and is added to a currently applicable register value ACTUAL. This addition is carried out in the adder ADD. It is also possible subsequently to enter the controller sequence at this point by means of status bits which are read in parallel. The sum NEW formed is stored and is passed back in the next step to the control logic device S, via the internal data bus IDB, as an absolute data item with a write command.

If conversion from relative data to absolute data is not allowed, then—according to FIG. 4—a write instruction is passed with the data ACTUAL to the control logic device S.

Figure 5:
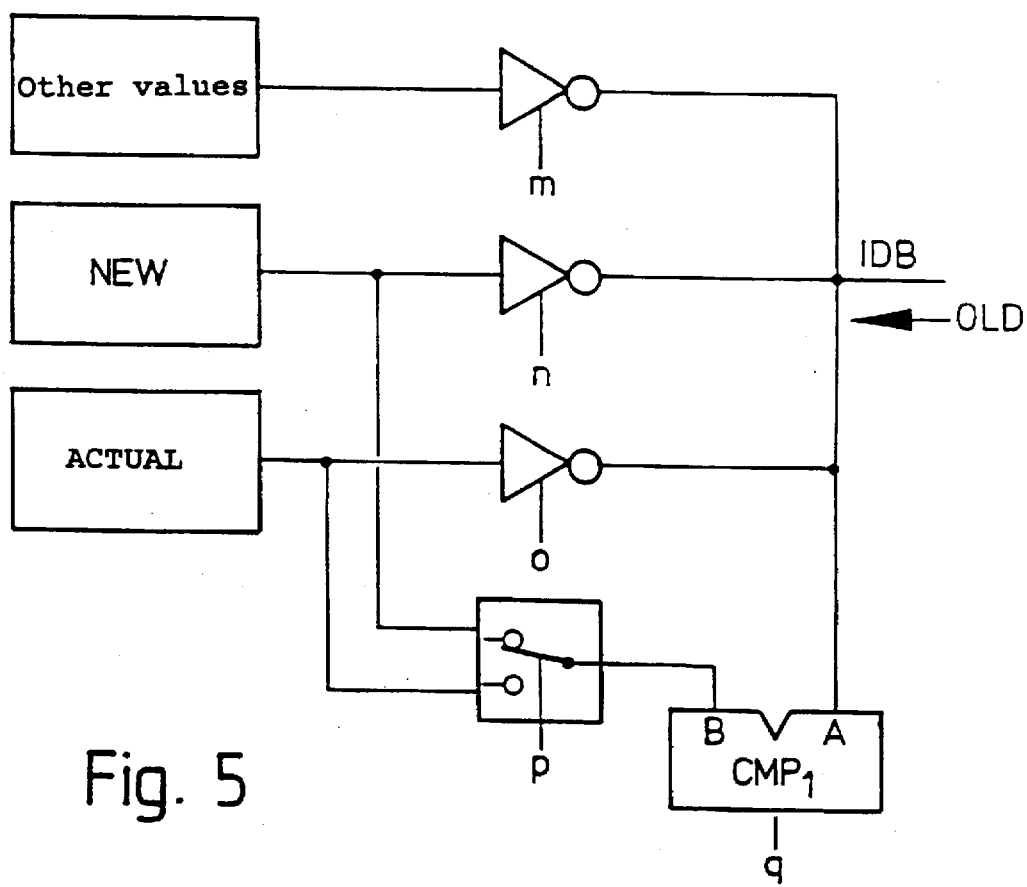
FIG. 5 is a further block diagram.

FIG. 5 describes register changes, that is, for example, an initiation value change in the fuel injection process. In the case of the change in a register value, the controller C tests its reaction using a maximum of four questions: firstly, it uses the register address to decide whether this is an initiation value register. In this case, the previous initial value OLD is read and is compared on the one hand with the new value NEW and on the other hand with the current ACTUAL value (ACTUAL). The difference between ACTUAL and NEW is formed as a last comparison. The results of these three comparisons are used to determine whether, for example, "jumping over" in accordance with FIGS. 2 and 3 has occurred. The new data NEW are sent in parallel to the control logic device S. The reaction to this is left to the control logic device S. The meanings in FIG. 5 are: m=write other values, n=write NEW value, o=write ACTUAL value, p=switch and q=result memory (for example shift register).

An exemplary embodiment of case c is now considered, that is for testing the data for consistency. In order to refuse inconsistent data, the controller C must know the tolerance band. The knowledge of this tolerance band is assumed. The processor P writes a new initiation value into the control logic device S. The controller C uses the address to detect the fact that this is an initiation value, and writes this value as the new initiation value into a buffer store. At the same time, the controller C uses the unchanged address to read the old initiation value into a second buffer store. The difference between the data is used to determine whether the new initiation value is larger than or smaller than the old initiation value. The controller C checks whether the new initiation value is in the defined tolerance band and/or whether the difference between the new initiation value and the old initiation value is in a defined, acceptable band. The new initiation value is not passed on from the controller C to the control logic device S unless these conditions are met.

In the case of control of the angular clock, the controller C receives an "angular clock" register and reports any change in the angular clock explicitly to the control logic device S. The processor P initiates a process of "incrementation of the angular clock", which increases the contents of the "angular clock" register by one increment. After this increase, the value of the "angular clock" register is sent via the internal data bus IDB to the control logic device S, while a specific combination of data on the internal address bus IAB and/or on the internal control bus ISB designates this process. The control logic device S can then compare the value of the angular clock with its own data, and initiate the corresponding reactions.

The following example is intended to illustrate case d, namely external events which are passed to the controller C, it being possible to initiate data communication between the controller C and the control logic device S independently of the processor P. In the case of automatic control of the angular clock, the controller C receives an "angular clock" register and reports any change in the angular clock explicitly to the control logic device S. An external (clock) event initiates a process of "incrementation of the angular clock", which increases the contents of the "angular clock" register by one increment. After this increase, the value of the "angular clock" register is sent via the internal data bus IDB to the control logic device S, while a specific combination of data on the internal address bus IAB and/or on the internal control bus ISB designates this process. The control logic device S can then compare the value of the angular clock with its own data, and initiate the corresponding reactions.

In a further example of the test case of the control logic device, the controller receives a data field (ReadOnlyMemory ROM) which contains a program and comprises statements on the required behavior of the control logic device. An external (test) event or the processor P initiates a "start test program" process; the controller C processes the program which is in the data field and in each case compares the required behavior, which can be seen on the internal busses IAB, IDB and ISB, of the control logic device with the stored data. In the event of an unpredicted reaction, either an error bit is set in a status register of the controller C or the test program is terminated, or the defective behavior is recorded. The processor P can thus test the correct behavior of the control logic device S without any activity itself. The test program can be a program which tests control logic devices, of which there are a number and which differ only by the address, either in parallel or successively by calling the test program a plurality of times. In the first case, part of the address on the internal address bus IAB is designated by the controller C, via the internal control bus ISB, as being ineffective (alternative: the control logic devices react identically to two addresses, the second address being the same for all the control logic devices), in the second case, the address in the test program is supplemented by a data item which is stored in the controller C to form the actual control logic device address for the internal address bus IAB. It is also conceivable to implement both cases alternatively.

The following text is intended to describe an arithmetic and logic unit which carries out the ignition system control in an internal combustion engine. In the case of the ignition system control, it is assumed that an ignition process starts by switching an ignition transistor at the angle αb and ends by switching off this ignition transistor, and the generation of an ignition spark, at an angle αe.

The controller C which is used has a plurality of, preferably eight, identical control logic devices which are controlled. Each of these control logic devices contains four registers, two of which are used as "start registers". The controller C additionally contains eight of its own registers, including two angular clocks, one of which is preset externally and the other is produced internally.

The above-mentioned angles αb and αe are present in two start registers of the control logic device S. The control logic device S further has a status register, in which the following statements are located:

whether an ignition control process is intended to be made, which of the two angular clocks is intended to be used, whether it is intended to carry out an ignition duration check, whether it is intended to carry out a check of the initial value changes.

The controller C contains two statements for controlling the ignition durations in the "minimum time" and "maximum time" registers.

The controller C has implemented the distinguishing of the cases for initial value changing via two lines of the internal control bus ISB. For every angular clock change, it sends the new angular clock value at an IAB angular clock address via the internal data bus IDB. The angular clock and start register cannot be changed simultaneously from the view point of the control logic device S by the internal data bus IDB, into which inputs can be made at only one end. WRITE data from the processor P to a start register are intercepted by the controller C. The controller C reads both the previous value of the start register and the contents of the status register of the relevant control logic device. If the check of the initial value changes is impeded by this, the controller C writes the WRITE data to the start register immediately. Otherwise, it uses the values read and the selected angular clock to determine the reaction of the control logic device S, and transmits this statement together with the WRITE data of the start register S in accordance with case a). The initiation of an ignition process is prepared by the detection of the start register 1=angular clock by switching on the ignition transistor and is ended by the detection of the start register 2=angular clock by switching off the ignition transistor and producing the ignition spark. If a check of the ignition durations is required by the control logic device status register, once an ignition process has been initiated by the detection of the start register 1=angular clock by switching on the ignition transistor the controller C is requested by the control logic device S, by means of a line of the internal status bus ISB, to output the value "minimum time" to the internal data bus IDB. This value is stored in an internal timer in the control logic device and is decremented to zero using a counting clock which is transmitted via the internal control bus ISB. As long as this timer is not equal to zero, the ignition transistor is not switched off, in order to ensure an ignition process, even if detection of the "start register 2"=angular clock occurs. If this detection occurs, the ignition transistor is switched off and the ignition spark is thus produced as soon as the timer reaches the value zero. If this detection does not occur, once the timer has elapsed, the control logic device S requests the controller C, via a further line of the internal status bus ISB, to output the value "maximum time" to the internal data bus IDB. This value is likewise stored in the timer and is decremented to zero. Detection of "start register 2"=angular clock switches the ignition transistor off in order to produce the ignition spark, and stops the timer. The sum of minimum time+maximum time–timer value can be calculated by the processor and thus, if necessary, the processor receives the precise duration of the ignition transistor activity. If the timer reaches the value zero, the ignition transistor is always switched off, for protection against overloading.

In the case of the implementation of an injection control system, the procedure is as follows:

An injection process starts at the angle αb by switching on an injection valve, and ends after an injection time t, by switching this valve off. The angle and injection time t are also located in both start registers. The following statements are located in the status register of the control logic device S:

whether an injection control process is intended to be made,
which of the two angular clocks is intended to be used,
whether it is intended to carry out a check of the initial value changes.

The controller C has implemented the distinguishing of the cases for initial value changing via two lines of the internal control bus ISB. For every angular clock change, it sends the new angular clock value at an IAB angular clock address via the internal data bus IDB. The angular clock and start register cannot be changed simultaneously from the view point of the control logic device S by the internal data bus IDB, into which inputs can be made at only one end. WRITE data from the processor P to a start register are intercepted by the controller C. The controller C reads both the previous value of the start register and the contents of the status register of the relevant control logic device S. If this prevents the check of the initial value changes or the addressing of the start register 2 during an injection control process is identified, the controller C writes the WRITE data into the start register immediately. Otherwise, it uses the values read and the selected angular clock to determine the reaction of the control logic device S, and transmits this statement together with the WRITE data of the start register S. The initiation of an injection process is started by the detection of start register 1=angular clock, by the control logic device S copying the value of the start register 2 (that is the injection time t) into an internal timer in the control logic device which is decremented using a counting clock which is sent via the internal control bus ISB. As long as the timer contains a value which is not equal to zero, the injection valve is switched on or remains switched on. If a repeated initiation of an injection process is detected by the detection of start register 1=angular clock, while the preceding injection process is still active, the value of the start register 2 is once again copied into the timer and the valve remains switched on. In this way, a continuous injection process can be implemented. If the timer is changed during an injection process by the processor P or the controller C by means of a WRITE instruction, this is used to extend or shorten (down to immediate termination if a zero is written in) the injection process. If the timer is changed outside an injection process by the processor P or the controller C by means of a WRITE instruction from zero to a value which is not equal to zero, this is used for subsequent injection of fuel in the event of large load changes (for example full accelerator suddenly applied) by switching the injection valve on once again.

I claim:

1. A controller system comprising a control logic device and a controller connected between a processor and the control logic device, wherein said control logic device includes a stored initiation value for initiating a task to be activated by the control logic device, means for making a comparison between the stored initiation value residing in the control logic device and an incrementally changing time value and means for initiating the task when the stored initiation value therein corresponds to the incrementally changing time value; and the controller includes means for making a comparison of a new initiation value transferred thereto from the processor, the stored initiation value and the time value with each other to obtain additional information, means for transferring the new initiation value to the control logic device for storage as the stored initiation value after the comparison in the controller and means for transmitting said additional information to the control logic device according to results of the comparison in the controller.

2. The controller system as defined in claim 1, wherein the control logic device includes means for activating the control logic device and initiating the task immediately when the additional information is received therein.

3. The controller system as defined in claim 1, wherein the control logic device includes means for not activating the control logic device and not initiating the task when the additional information is received therein.

4. The controller system as defined in claim 1, further comprising means for transferring informational data regarding the new initiating value from the processor to the controller, and wherein said informational data comprises the stored initiating value.

5. The controller system as defined in claim 1, further comprising means for transferring informational data regarding the new initiating value from the processor to the controller, and wherein said informational data comprises a relative value and said controller includes means for determining a new initiation value by analysis of the relative value and the stored initiation value.

6. The controller system as defined in claim 1, wherein the controller includes means for testing whether said new initiating value is within a predetermined tolerance range during the comparison in the controller and means for preventing storage of the new initiating value in the control logic device as the stored initiating value when the new initiating value is outside the predetermined tolerance range.

* * * * *